US012732442B2

(12) United States Patent
Agrawal et al.

(10) Patent No.: US 12,732,442 B2
(45) Date of Patent: Sep. 8, 2026

(54) APPLICATION RECORDS USING SESSION INFORMATION

(71) Applicant: Juniper Networks, Inc., Sunnyvale, CA (US)

(72) Inventors: Kaushik Adesh Agrawal, Chelmsford, MA (US); Jisheng Wang, Palo Alto, CA (US); Greg Schrock, Billerica, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 61 days.

(21) Appl. No.: 18/336,130

(22) Filed: Jun. 16, 2023

(65) Prior Publication Data

US 2023/0336446 A1 Oct. 19, 2023

Related U.S. Application Data

(63) Continuation of application No. 17/452,344, filed on Oct. 26, 2021, now Pat. No. 11,711,279.

(51) Int. Cl.
*H04L 43/067* (2022.01)
*H04L 43/062* (2022.01)
(Continued)

(52) U.S. Cl.
CPC .......... *H04L 43/067* (2013.01); *H04L 43/062* (2013.01); *H04L 45/306* (2013.01); *H04L 67/14* (2013.01)

(58) Field of Classification Search
CPC ... H04L 53/067; H04L 43/062; H04L 45/306; H04L 67/14; H04L 43/067
See application file for complete search history.

(56) References Cited

U.S. PATENT DOCUMENTS 9,398,347 B2 * 7/2016 Jadallah .............. H04L 65/1094
9,419,942 B1 * 8/2016 Buruganahalli .... H04L 63/0263
(Continued)

FOREIGN PATENT DOCUMENTS

EP 3780523 A1 2/2021

OTHER PUBLICATIONS

"Transmission Control Protocol," Darpa Internet Program Protocol Specification, Information Sciences Institute, RFC 793, Sep. 1981, 91 pp.
(Continued)

*Primary Examiner* — Andrew C Georgandellis
(74) *Attorney, Agent, or Firm* — Shumaker & Sieffert P.A.

(57) ABSTRACT

Techniques are disclosed for the identification of applications from communication sessions of network traffic between client devices and the generation of application-specific metrics for network traffic associated with the applications. In one example, a router obtains metrics for a plurality of packets. The router determines a session of a plurality of sessions associated with each packet. For each determined session, the router generates metrics for the session from the metrics of the packets associated with the session and determines an application of a plurality of applications associated with the session. For each determined application, the router generates metrics for the application from the metrics of the sessions associated with the application and transmits, to a device, the metrics for the application. In some examples, the router generates the metrics for each application on a per-client, per-next-hop, or per-traffic class basis.

19 Claims, 4 Drawing Sheets

(51) Int. Cl.
*H04L 45/302* (2022.01)
*H04L 67/14* (2022.01)

(56) References Cited

U.S. PATENT DOCUMENTS 9,729,439 B2 8/2017 MeLampy et al.
9,729,682 B2 8/2017 Kumar et al.
9,762,485 B2 9/2017 Kaplan et al.
9,871,748 B2 1/2018 Gosselin et al.
9,942,161 B1 * 4/2018 Chen .................. H04L 47/2491
9,985,883 B2 5/2018 MeLampy et al.
10,200,264 B2 2/2019 Menon et al.
10,277,506 B2 4/2019 Timmons et al.
10,432,522 B2 10/2019 Kaplan et al.
10,700,982 B2 * 6/2020 Bajaj .................. H04L 41/5022
11,108,851 B1 * 8/2021 Kurmala ............. H04L 41/0816
11,252,084 B1 2/2022 Cai et al.
11,658,902 B2 5/2023 Baj et al.
2002/0013849 A1 * 1/2002 Schweitzer ........... H04M 15/00 709/227
2007/0156919 A1 7/2007 Potti et al.
2008/0181208 A1 7/2008 Maes
2013/0272121 A1 10/2013 Stanwood et al.
2015/0074266 A1 3/2015 Alisawi et al.
2015/0222939 A1 8/2015 Gallant et al.
2016/0080252 A1 3/2016 Ramachandran et al.
2017/0237777 A1 8/2017 Joch et al.
2018/0278629 A1 9/2018 McGrew et al.
2018/0287905 A1 10/2018 Mehta et al.
2018/0375745 A1 12/2018 Balupari
2019/0089678 A1 3/2019 Lam et al.
2020/0241996 A1 * 7/2020 Dillon, Jr. ............... H04L 67/10
2020/0252468 A1 8/2020 Momchilov
2020/0403890 A1 12/2020 McCulley et al.
2021/0160275 A1 5/2021 Anderson et al.
2021/0250192 A1 8/2021 Alonso Franco et al.
2021/0328924 A1 10/2021 Seed et al.
2022/0023755 A1 1/2022 Vukojevic et al.
2022/0029906 A1 1/2022 Mahesh et al.
2022/0172076 A1 * 6/2022 Kanza .................... G06N 3/044
2022/0376998 A1 * 11/2022 Vasseur ............... H04L 41/5067
2023/0027754 A1 * 1/2023 Kolar .................. H04L 41/0631
2023/0069434 A1 3/2023 Cheng et al.
2023/0128098 A1 4/2023 Agrawal et al.

OTHER PUBLICATIONS

Extended Search Report from counterpart European Application No. 22151819.4 dated Jun. 22, 2022, 15 pp.
Menon et al. "Secure Vector Reouting (SVR)," draft-menon-svr-00, Network Working Group, Internet-Draft, Oct. 1, 2021, 38 pp.
Postel, "User Datagram Protocol," RFC 768, Aug. 28, 1980, 3 pp.
Prosecution History from U.S. Appl. No. 17/452,344, dated Jan. 3, 2022 through Mar. 13, 2023, 86 pp.
Response to Extended Search Report dated Jun. 22, 2022, from counterpart European Application No. 22151819.4 filed Nov. 1, 2023, 17 pp.

* cited by examiner

APPLICATION RECORDS USING SESSION INFORMATION

This application is a continuation of U.S. patent application Ser. No. 17/452,344, filed Oct. 26, 2021, the entire contents of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for the identification of applications from communication sessions of network traffic between client devices and the generation of application-specific metrics for network traffic associated with the applications. Each session of a plurality of sessions comprises a forward packet flow and a reverse packet flow between a source client device and a destination client device of a plurality of client devices. In one example, a router receives a plurality of packets. For each packet of the plurality of packets, the router obtains metrics for the packet and determines a session of the plurality of sessions associated with the packet.

For each determined session, the router generates metrics for the session at least in part from the metrics for each packet determined to be associated with the session. Further, for each determined session, the router determines an application associated with the session. For each determined application of a plurality of applications, the router generates metrics for the application, at least in part from the metrics for each session determined to be associated with the application, such as metrics for each application on a per-client, per-next-hop, or per-traffic class basis.

In some examples, the router transmits, to a device such as a collector, the metrics for each application such that the device may, for example, apply a machine learning system or other computational algorithm or model to the metrics for each application for application health or troubleshooting analysis. In some examples, the router selects, based on the metrics for each application, a network path for use in forwarding at least one packet associated with a session that is associated with an application. In some examples, the router outputs, for presentation to a user, the metrics for each application.

The techniques of the disclosure may provide specific improvements to the computer-related field of computer networking that have practical applications. For example, the techniques of the disclosure may enable a router to use information obtained from a communication session comprising network traffic exchanged between two client devices to identify a higher-level application associated with the communication session. Additionally, a router may collect various metrics for multiple sessions and aggregate such metrics into application-specific metrics for each application associated with the multiple sessions. This may enable a router to transmit, to a device such as a collector, application-specific records of metrics for each application, instead of session-specific records of metrics for each session (or packet-specific records of metrics for each packet), thereby considerably reducing the bandwidth consumed for transmitting metrics for network traffic. The techniques of the disclosure may therefore enable a plurality of routers to collect and exchange metrics for each application of a plurality of applications on a per-client, per-next-hop, or per-traffic class basis. Such application-specific records may provide an administrator with a more comprehensive understanding of the behavior of network traffic associated with an application, thereby enabling the creation of more efficient path selection of network traffic and increasing the accuracy of network diagnostics and application troubleshooting.

In one example, this disclosure describes a method comprising: receiving, by a router, a plurality of packets; for each packet of the plurality of packets: obtaining, by the router, one or more metrics for the packet; and determining, by the router, a session associated with the packet, wherein a plurality of sessions include the session associated with the packet, and wherein each session of the plurality of sessions comprises a forward packet flow and a reverse packet flow between a source client device and a destination client device of a plurality of client devices; for each determined session of the plurality of sessions: generating, by the router, one or more metrics for the session at least in part from the one or more metrics for each packet of the plurality of packets determined to be associated with the session; and determining, by the router, an application associated with the session, wherein a plurality of applications include the application associated with the session; and for each determined application of the plurality of applications: generating, by the router, one or more metrics for the application at least in part from the one or more metrics for each session of the plurality of sessions determined to be associated with the application; and transmitting, by the router and to a device, the one or more metrics for the application.

In another example, this disclosure describes a router comprising processing circuitry configured to: receive a plurality of packets; for each packet of the plurality of packets: obtain one or more metrics for the packet; and determine a session associated with the packet, wherein a plurality of sessions include the session associated with the packet, and wherein each session of the plurality of sessions comprises a forward packet flow and a reverse packet flow between a source client device and a destination client device of a plurality of client devices; for each determined session of the plurality of sessions: generate one or more metrics for the session at least in part from the one or more metrics for each packet of the plurality of packets determined to be associated with the session; and determine an application associated with the session, wherein a plurality of applications include the application associated with the session; and for each determined application of the plurality of applications: generate one or more metrics for the application at least in part from the one or more metrics for each session of the plurality of sessions determined to be associated with the application; and transmit, to a device, the one or more metrics for the application.

In another example, this disclosure describes a non-transitory, computer-readable medium comprising instructions that, when executed, are configured to cause processing circuitry of a router to: receive a plurality of packets; for each packet of the plurality of packets: obtain one or more metrics for the packet; and determine a session associated with the packet, wherein a plurality of sessions include the session associated with the packet, and wherein each session of the plurality of sessions comprises a forward packet flow and a reverse packet flow between a source client device and a destination client device of a plurality of client devices; for each determined session of the plurality of sessions: generate one or more metrics for the session at least in part from the one or more metrics for each packet of the plurality of packets determined to be associated with the session; and determine an application associated with the session, wherein a plurality of applications include the application associated with the session; and for each determined application of the plurality of applications: generate one or more metrics for the application at least in part from the one or more metrics for each session of the plurality of sessions determined to be associated with the application; and transmit, to a device, the one or more metrics for the application.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
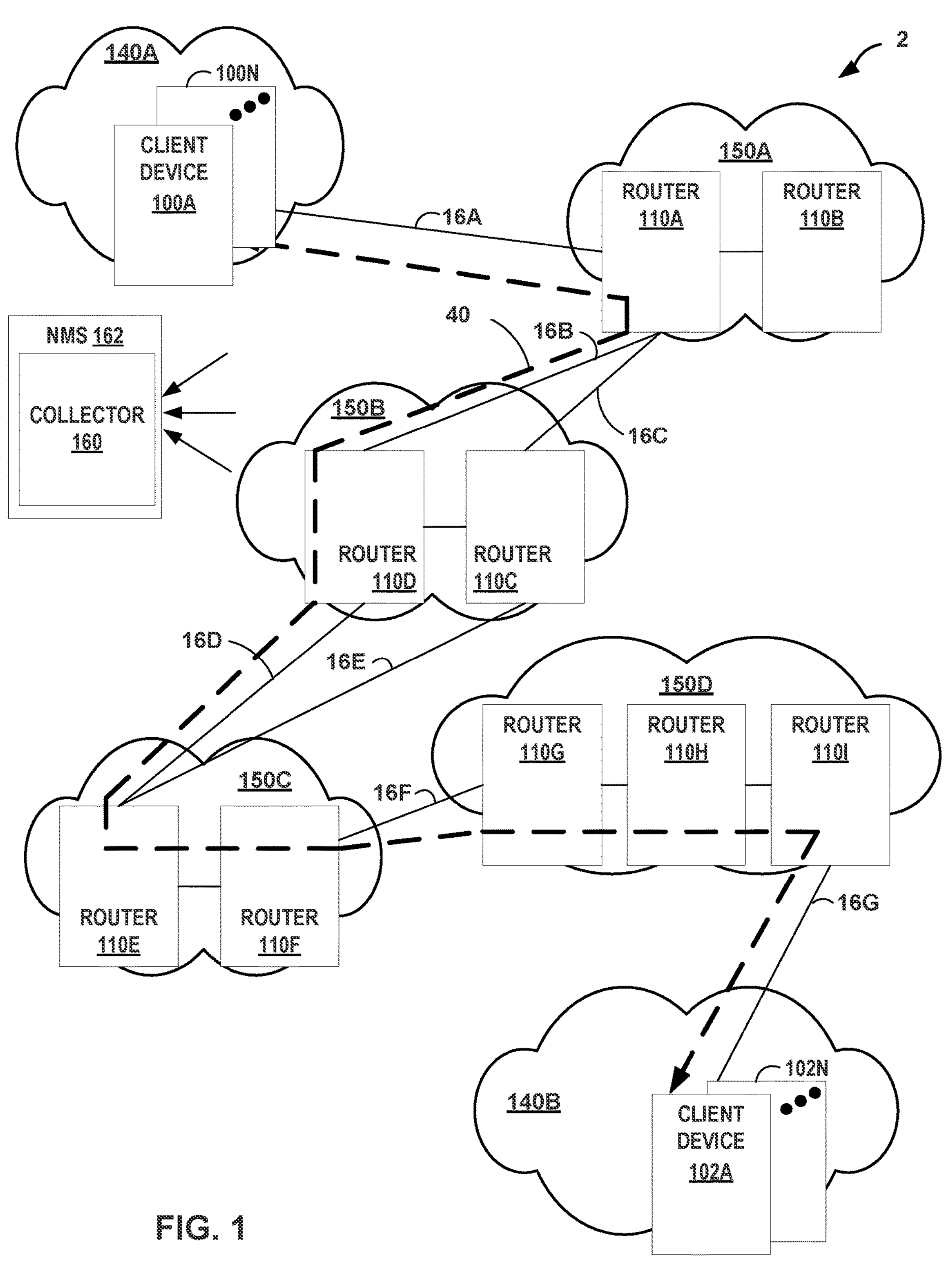
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100N (collectively, "client devices 100") and client devices 102A-102N (collectively, "client devices 102") associated with customer networks 140 with access to service provider networks 150. In some examples, customer networks 140 are enterprise networks. Client devices 100, 102 and/or routers 110 may communicate with communication links 16A-16G (collectively, links "16"), which may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and 102, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, network service instances 104A-104N (collectively, "network service instances 104") may apply one or more network services to traffic of client devices 100, 102. Each network service instance 104 may be, e.g., a virtualized network service instantiated by a virtual machine executed by processing circuitry of a server. In some examples, network service instances 104A are a plurality of firewall instances that provide stateful firewall services to traffic of client devices 100, 102. In some examples, network service instances 104A are a plurality of deep packet inspection instances that provide deep packet inspection services to traffic of client devices 100, 102.

Traffic data collector 160 collects data records for network traffic of computer network system 2. In some examples, collector 160 or an analysis application (not shown) can use various information, metrics, or statistics about the network traffic to determine various aspects of the network traffic, which may be used to, e.g., perform traffic engineering, analytics and health monitoring, deep packet inspection, etc.

In some examples, traffic data collector 160 is part of network management system (NMS) 162. NMS 162 is a cloud-based computing platform that manages service provider networks 150 and provides an integrated suite of network management tools. In general, NMS 162 may provide a cloud-based platform for network data acquisition, monitoring, activity logging, reporting, predictive analytics, network anomaly identification, and alert generation. In some examples, NMS 162 applies machine learning techniques to data collected by collector 150 to perform traffic engineering, identify root causes of failure, provide real-time insights and simplified troubleshooting for IT operations, and automatically takes remedial action or provides recommendations to proactively address issues with the operation of network system 2. In some examples, NMS 162 may comprise one or more computing devices, dedicated servers, virtual machines, containers, services or other forms of environments. Additional description of NMS 162 is described in U.S. patent application Ser. No. 17/446,601, entitled "IDENTIFYING ROOT CAUSE OF FAILURES THROUGH DETECTION OF NETWORK SCOPE FAILURES," filed on Aug. 31, 2021, the entire contents of which are incorporated herein by reference.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 102A. Routers 110 facilitate establishment of session 40 by transporting network traffic between client device 100A and client device 102A. In some examples, client device 100A may be considered a "source" device and client device 102A may be considered a "destination device" in that client device 100A originates session 40 between client device 100A and client device 102A, e.g., client device 100A is the "source" of a packet of a forward packet flow of the session while client device 102A is the "destination" of the packet of the forward packet flow of the session. Client device 100A may be referred to as a "source device" and client device 102A may be referred to as a "destination device" through the disclosure. Session 40 includes a forward packet flow originating from client device 100A and destined for client device 102A and a reverse packet flow originating from client device 102A and destined for client device 100A. A forward packet flow for session 40 traverses a first path including, e.g., client device 100A, one or more of routers 110A-110I, and client device 102A. As described in more detail below, routers 110 enable the exchange of traffic between customer network 140A, across service provider networks 150, to customer network 140B.

Client device 100A (e.g., a source device) may establish session 40 with client device 102A (e.g., a destination device) according to one or more L2 or L3 communication session protocols, including Ethernet, TCP, or UDP. As described in more detail below, customer network 140A may form a first network and customer network 140B may form a second network. Routers 110 operate to extend customer network 140A across service provider networks 150 to customer network 140B. In this fashion, customer network 140A and customer network 140B may operate as if they were both part of the same network, even though customer network 140A and customer network 140B may be logically isolated and geographically separate from one another. Furthermore, routers 110 may operate such that the existence of service provider networks 150 between customer network 140A and customer network 140B is transparent to client devices 100, 102.

In some examples, routers 110 may extend session 40 across service provider networks 150 according to one or more communication session protocols, including TCP or UDP, etc. For example, to establish session 40 according to TCP such that data may be exchanged according to TCP, router 110A and router 110B perform a three-way handshake. Router 110A sends a first packet comprising a "SYN" flag to router 110B. Router 110B acknowledges receipt of the first packet by responding to router 110A with a second packet comprising a "SYN-ACK" flag. Router 110A acknowledges receipt of the second packet by responding to router 110B with a third packet comprising an "ACK" flag. After sending the third packet, session 40 is established according to TCP and routers 110A, 110B may exchange data with one another (e.g., by exchanging data packets of client device 100A and client device 102A) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 102A, router 110A determines whether the packet belongs to a new session (e.g., is the "first" packet or "lead" packet of session 40). In some examples, router 110A determines information included in the first packet (e.g., a source address, source port, destination address, destination port, and protocol) matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 102A, a protocol used by the first packet, an interface identifier of an interface of client device 100A from which the packet is forwarded, and a Virtual Local Area Network (VLAN) identifier to which client deice 100A is assigned. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI) or stateful firewall services.

In the example of FIG. 1, a stateful routing session may be established from ingress router 110A through one or more of intermediate routers 110C-110H to egress router 110I. In this example, router 110A determines that the first packet is an unmodified packet and the first packet of new session 40. Router 110A modifies the first packet to include metadata specifying the session identifier (e.g., the original source address, source port, destination address, destination port, and/or protocol) and/or other policy and control parameters. Router 110A replaces the header of the modified first packet to specify a source address that is an address of router 110A, a source port that is a port via which router 110A forwards the modified first packet toward server 103, a destination address that is an address of the next hop to which router 110A forwards the first packet (e.g., an address of router 110D), and a destination port that is a port of the next hop to which router 110A forwards the first packet (e.g., a port of router 110D). Additionally, router 110A stores the session identifier for session 40 and an indication of the selected next hop for session 40 (e.g., router 110D) such that, upon receiving subsequent packets for session 40, router 110A may identify the subsequent packets as belonging to the same session 40 and forward the subsequent packets along the same path as the first packet without modification to include the metadata.

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 102A. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 102A. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Intermediate router 110B receives the modified first packet and determines whether the modified first packet includes metadata specifying the session identifier. In response to determining that the modified first packet includes metadata specifying the session identifier, intermediate router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 102A, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100A.

A router 110 that may forward packets for a forward packet flow of the session to a destination for the packet flow is an egress, or "terminus" router. In the foregoing example, router 110I is a terminus router because router 110I may forward packets to client device 102A. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 102A). Router 110I recovers the original first packet by removing the metadata from the modified first packet and using the metadata to modify the header of the first packet to specify the original source address, source port, destination address, and destination port. Router 110I forwards the recovered first packet to client device 102A.

The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Additional information with respect to session-based routing and SVR is described in "Secure Vector Routing (SVR)," Internet Draft, Network Working Group, IETF, Oct. 1, 2021, available at https://datatracker.ietf.org/doc/draft-menon-svr, the entire contents of which are incorporated herein by reference.

Application Records Using Session Information.

In general, the disclosure describes techniques for the identification of applications from communication sessions of network traffic between client devices and the generation of application-specific metrics for network traffic associated with the applications. As described herein, an "application" typically refers to a software program or protocol that performs a specialized function. The purpose of a typical application is to establish a connection between a client device and a server hosting the application with the intention of sending and receiving data to/from the server. In contrast, a service refers to a logical grouping of one more applications defined in order to apply policy and routing decisions. A "service" typically answers the questions such as who has access to applications of a particular type, how applications of such a type are prioritized or treated, and how applications of such a type may be reached (or routed) by routers 110. This is an oversimplification of the notion of a "service" but illustrates the differences between an "application" and a "service."

As an illustrative example, a first videoconferencing program provided by a first vendor and a second videoconferencing program provided by a second vendor represent individual applications. Collectively, the first and second videoconferencing programs may be categorized as providing a videoconferencing service such that networking, routing, and security policies specific to the videoconferencing service may be applied to network traffic associated with the first and second videoconferencing programs. This type of logical grouping is very powerful as the needs of the specific applications change and adapt. For example, the distinction between applications and services enable the abstraction to a standard policy that may be applied to all videoconferencing applications, and as new applications (or software versions) are added or old ones are retired, changes may be made only to a single service policy definition.

A conventional router collects metrics on a per-packet basis. Such metrics may include, e.g., a time a packet was received, a size of the packet, etc. The conventional router collects such metrics for packets and sends them to a collector for analysis. Transmitting metrics for each packet received by the router would likely consume an unacceptable amount of network resources, so the conventional router often performs packet sampling wherein the conventional router obtains metrics for only a small percentage of packets received that are assumed to be representative of the traffic received and forwarded by the router and the analysis performed by the collector on the small sample size may result in less accurate analysis.

In some examples, a conventional router may collect metrics on a per-session basis. As described above, a session comprises a forward packet flow and a reverse packet flow between a source client device and a destination client device. Using the aforementioned techniques, a conventional router may correlate packets of a forward packet flow and packets of a reverse packet flow such that the conventional router may aggregate metrics for each packet into metrics for each session of a plurality of sessions. With respect to the foregoing example, the router may aggregate metrics for multiple packets of a session into a session record comprising, e.g., a time a first packet associated with the session was received, a total size of data received for the forward packet flow, a total size of data received for the reverse packet flow, etc. In some examples, the conventional router may obtain other types of metrics for the session, such as a time the session has been active, a time since the router received a previous packet associated with the session, etc. Additional information with respect to the collection and generation of session-based metrics may be found in U.S. patent application Ser. No. 17/239,277, entitled "SESSION MONITORING USING METRICS OF SESSION ESTABLISHMENT," filed on Apr. 23, 2021, the entire contents of which are incorporated by reference herein. However, a router may have a large number of sessions for which the router forwards packets, and so transmitting metrics for each session may still consume an unacceptable amount of network resources.

In accordance with the techniques of the disclosure, routers 110 may identify applications from sessions of network traffic between client devices 100, 102 so as to enable the generation of application-specific metrics for network traffic associated with the applications. In one example, router 110A receives a plurality of packets from, e.g., client devices 100. For each packet received by router 110A, router 110A obtains one or more metrics for the packet (e.g., a time a packet was received, a size of the packet, etc.). Additional examples of various metrics for the packet are described below with respect to FIG. 2.

Additionally, for each packet received by router 110A, router 110A determines a session associated with the packet. For example, using the techniques described above, router 110 may use header information of a first packet (e.g., a source address, a source port, a destination address, a destination port, and a network protocol), to identify a first session associated with the first packet. The first session comprises a first forward packet flow originating from client device 100A and destined for client device 102A and a reverse packet flow originating from client device 102A and destined for client device 100A. As another example, router 110 may use header information of a second packet to identify a second session associated with the second packet. For example, the second session may comprise a second forward packet flow originating from client device 100B and destined for client device 102B and a reverse packet flow originating from client device 102B and destined for client device 100B. For each determined session, router 110A generates metrics for the session at least in part from the metrics for each packet determined to be associated with the session. For example, router 110A aggregates a plurality of packet-based metrics for each packet of the session into metrics for the session (e.g., a time a first packet associated with the session was received, a total size of data received for the forward packet flow, a total size of data received for the reverse packet flow, etc.). Examples of various metrics for the session are described below with respect to FIG. 2.

Further, for each determined session of the plurality of sessions, router 110A determines an application associated with the session. Router 110A may use a variety of techniques (described in more detail below) to determine the application associated with each determined session. For example, router 110A may identify an application associated with a session using built-in definitions for application types, a Server Name Indication (SNI) carried by a packet of the session, a domain name server (DNS) request associated with the session, IP prefix information, a combination of one or more of a source address, a source port, a destination address, or a destination port associated with the session, DPI, or a service name specified by metadata of packets associated with the session.

Additionally, in some examples, router 110A determines a traffic category or traffic class of the application. For example, router 110A determines that the application belongs to a traffic category or traffic class such as a real-time traffic category, such as a Voice over Internet Protocol (VoIP) category, an Interactive Video category, a remote desktop category, or a gaming category or a non-real-time traffic category, such as a network management category, a streaming video category, an interactive data category, or a data transfer category. In some examples, the application may belong to another category not expressly described herein.

For each determined application of a plurality of applications, router 110A generates metrics for the application at least in part from the metrics for each session determined to be associated with the application. For example, router 110A aggregates a plurality of session-based metrics for each session associated with the application into metrics for the application. In some examples, router 110A generates the metrics for each application on per-client, per-next-hop, or per-traffic class basis. Examples of various metrics for the application are described below with respect to FIG. 2.

In some examples, router 110A transmits, to another device such as collector 160, the metrics for each application of the plurality of applications. Additionally, each router 110 of computer network system 2 may generate metrics for each application of the plurality of applications in a similar fashion and transmit such metrics to collector 160. Collector 160 collects the metrics for each application of the plurality of applications from each router 110 such that an administrator may use the metrics for network analysis and analytics. In some examples, collector 160 applies a machine learning system or other computational algorithm or model to the metrics for each application of the plurality of applications for application health or troubleshooting analysis.

In some examples, router 110A selects, based on the metrics for each application of the plurality of applications, a network path for use in forwarding at least one packet associated with a session that is associated with an application of the plurality of applications. In some examples, router 110A outputs, for presentation to a user, the metrics for each application of the plurality of applications.

Figure 2:
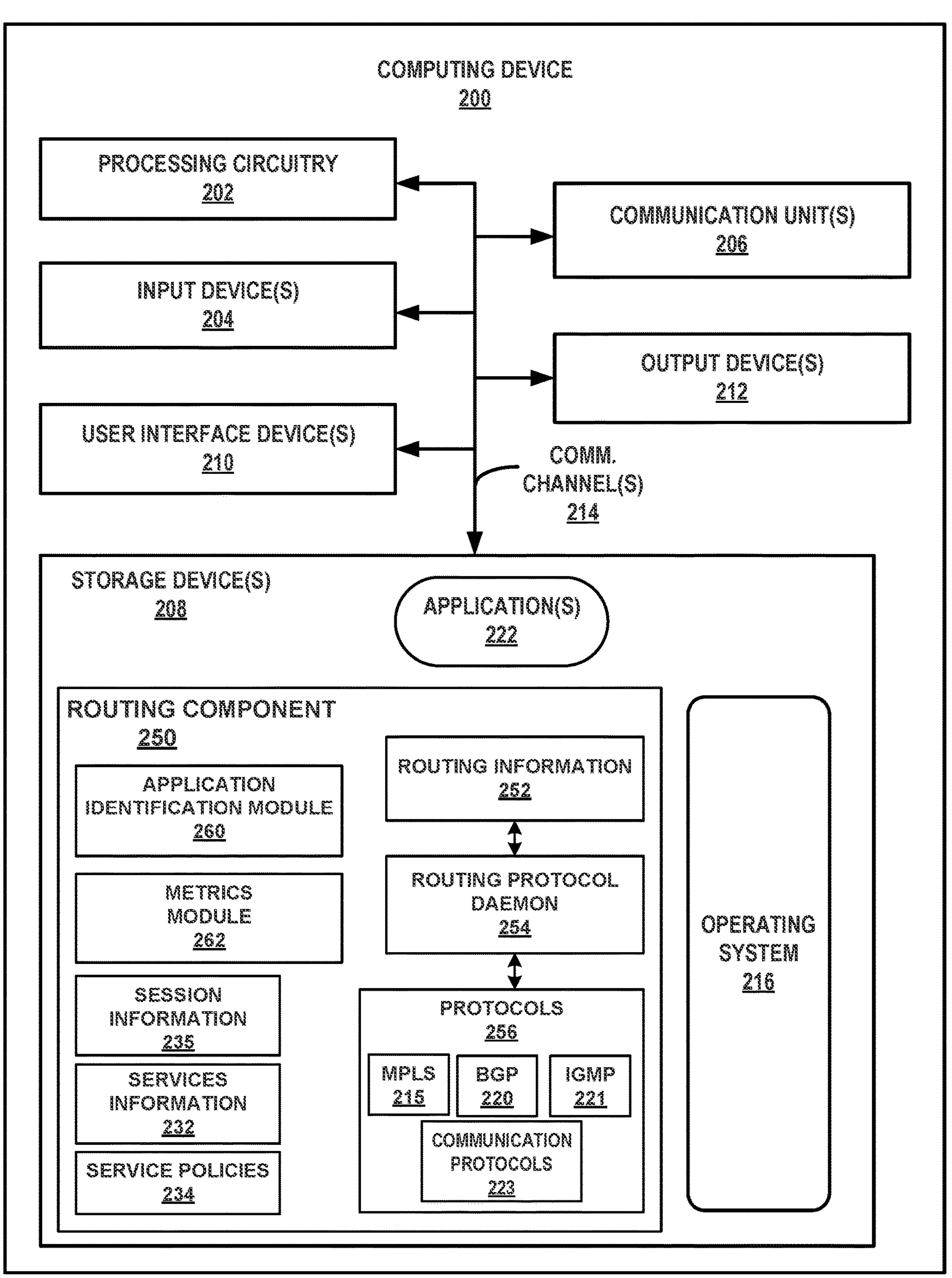
FIG. 2 is a block diagram illustrating an example computing device in accordance with the techniques of the disclosure.

FIG. 2 is a block diagram illustrating an example computing device 200 in accordance with the techniques of the disclosure. In general, computing device 200 may be an example implementation of one of routers 110 of FIG. 1. FIG. 2 illustrates a particular example of a server or other computing device 200 that includes processing circuitry 202 for executing any one or more of applications 222, routing component 250, or any other computing device described herein. Other examples of computing device 200 may be used in other instances.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., VirtIO and SRIOV network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input devices 204, one or more communication units 206, one or more output devices 212, one or more storage devices 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, are configured to implement functionality and/or process instructions for execution within computing device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on computing device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 206. Computing device 200, in one example, utilizes communication units 206 to communicate with external devices via one or more networks, such as one or more wired/wireless/mobile networks. Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 my include a plurality of high-speed network interface cards. In some examples, computing device 200 uses communication unit 206 to communicate with an external device. For example, computing device 200 uses communication unit 206 to communicate with other routers 110 and/or client devices 100 of FIG. 1 via links 16 of FIG. 1 with which communication unit 206 is connected.

Computing device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output devices 212 may also be included in computing device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit 206, storage device 208, input device 204, user interface devices 210, and output device 212. Applications 222 may also include program instructions and/or data that are executable by computing device 200.

In some examples, processing circuitry 202 executes routing component 250, which determines routes of received packets and forwards the packets accordingly. Routing component 250 communicates with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which computing device 200 resides, and may also include routes through the shared trees in the computer network. Routing information 252 describes various routes within the computer network, and the appropriate next hops for each route, i.e., the neighboring routing devices along each of the routes. Routing information 252 may be a radix tree programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Differentiated Services Code Point (DSCP) marking policy, a traffic engineering policy, a priority for network traffic associated with the session, etc. Routing component 250 applies, to the packet, the one or more service policies 234 that correspond to the service associated with the packet.

In accordance with the techniques of the disclosure, computing device 200 may identify applications from sessions of network traffic between client devices 100, 102 of FIG. 1 so as to enable the generation of application-specific metrics for network traffic associated with the applications. In one example, routing component 250 receives a plurality of packets from, e.g., client devices 100, via communication unit 206. For each packet received by routing component 250, metrics module 262 obtains metrics for the packet. In some examples, the metrics may include packet-based metrics, such as a size (in bytes) of the packet, a source address and source port of the packet, a destination address and destination port of the packet, a network protocol used by the packet, a time at which routing component 250 received the packet, a time at which routing component 250 forwarded the packet, an interface upon which routing component 250 received the packet, an interface upon which routing component 250 forwarded the packet, etc. Metrics module 262 may additionally generate other types of metrics not expressly described herein for each received packet.

Additionally, for each packet received by routing component 250, routing component 250 determines a session associated with the packet. For example, using the techniques described above, routing component 250 may use header information of a first packet (e.g., a source address, a source port, a destination address, a destination port, and a network protocol), to identify a first session associated with the first packet. For example, the first session may comprise a first forward packet flow originating from client device 100A and destined for client device 102A and a reverse packet flow originating from client device 102A and destined for client device 100A. Routing component 250 stores the session information in session information 235 such that routing component 250 may correlate subsequent packets of the first forward packet flow and first reverse packet flow as belonging to the same session as the first packet.

For each determined session, metrics module 262 generates metrics for the session at least in part from the metrics for each packet determined to be associated with the session. For example, metrics module 262 aggregates a plurality of packet-based metrics for each packet of the session into metrics for the session. For example, metrics module 262 generates, for the first session, session-based metrics including, for example, a total size (in bytes) of packets associated with the first session received by routing component 250, a total size (in bytes) of packets associated with the first forward flow of the first session received by routing component 250, a total size (in bytes) of packets associated with the first reverse flow of the first session received by routing component 250, a total size (in bytes) of packets associated with the first session forwarded by routing component 250, a total size (in bytes) of packets associated with the first forward flow of the first session forwarded by routing component 250, a total size (in bytes) of packets associated with the first reverse flow of the first session forwarded by routing component 250, a time at which routing component 250 received a most recent packet for the session, a time at which routing component 250 forwarded a most recent packet for the session, etc. Metrics module 262 may additionally generate other types of metrics not expressly described herein for each determined session.

Further, for each determined session of the plurality of sessions, application identification module 260 determines an application associated with the session. Application identification module 260 may use numerous different types of methodologies to determine the application associated with each determined session.

In some examples, application identification module 260 may identify an application associated with a session using built-in definitions for application types. For example, certain types of applications may be provided by well-published sources. Furthermore, the names of such applications may be fairly consistent across different deployments. Application identification module 260 may use built-in definitions to identify an application associated with a session with a high level of confidence. For example, application identification module 260 may be pre-configured with definitions for use in identifying particular applications. For example, application identification module 260 may include a first definition that identifies a word processing and office productivity suite application based on a destination IP address, destination port, and protocol used by network traffic associated with the word processing and office productivity suite application. As another example, application identification module 260 may include a second definition that identifies a cloud email application based on a DNS record resolution and an SNI obtained from a TLS certificate used by network traffic associated with the cloud email application. Additionally, application identification module 260 may include one or more other definitions that may identify an application using similar, additional, or alternate criteria not expressly described herein. In some examples, an administrator may define one or more definitions for one or more applications supported by application identification module 260.

In some examples, application identification module 260 may identify an application associated with a session using a Server Name Indication (SNI) carried by a packet of the session. SNI is an optional TLS extension which is extremely commonplace and allows a packet to specify a name of a host, server, or application associated with the session. TLS 1.3 allows for this information to be encrypted. However, where unencrypted, application identification module 260 may extract the hostname to determine the application associated with the session. Application identification module 260 may use SNI to identify an application associated with a session with a high level of confidence.

In some examples, application identification module 260 may identify an application associated with a session using a domain name server (DNS) request associated with the session. In a common deployment scenario, computing device 200 operates as a proxy and cache for DNS requests on a client network (such as customer network 140A where computing device 200 implements router 110A of FIG. 1). Where computing device 200 operates as the proxy for DNS requests, application identification module 260 may snoop domain-to-IP information of packets received from, e.g., client device 100A before creation of a session with, e.g., client device 102A to identify the application, as well as offering additional insights into the identified application. DNS caching is an optional feature and can be activated on demand. Application identification module 260 may use DNS proxy to identify an application associated with a session with a high level of confidence.

In some examples, application identification module 260 may identify an application associated with a session using IP prefix information. For example, each of routers 110 of FIG. 1 may include, in each packet and prior to forwarding the packet, metadata that specifies application identification information. In some examples, this metadata is in the form of an IP prefix. Application identification module 260 extracts, from the metadata of a packet, application identification information so as to identify the application. Application identification module 260 may use such IP prefix information to identify an application associated with a session with a medium level of confidence.

In some examples, application identification module 260 may identify an application associated with a session using address information of a session associated with the application, such as a combination of one or more of a source address, a source port, a destination address, a destination port, or a destination protocol associated with the session. In some situations, application identification module 260 may identify some applications based on, e.g., a destination protocol and port number alone. For example, the use of port 5060 may imply the use of a Session Initiation Protocol (SIP) application. As another example, the use of TCP protocol and port 22 may imply the use of Secure Shell (SSH) application. In some examples, this may also be expressed as session type. This type of application mapping is a "best guess" approach, and may work only for known address or port numbers. However, because the use of a specific port number is not required, there is no guarantee that the underlying session is of the determined type. For example, an SSH server can be hosted on TCP Port 5060, such that application identification module 260 may classify the session as SIP instead of SSH using this methodology. Furthermore, this type of classification may generally be useful only for providing basic treatment to traffic, such as a priority level, service classification, or priority level that may be applied to network traffic associated with the application. Application identification module 260 may use address information of a session associated with the application to identify an application associated with a session with a low level of confidence.

In some examples, application identification module 260 may identify an application associated with a session using DPI. DPI refers to the method of examining a full content of a packet associated with a session. In addition to examining the header of the packet, application identification module 260 may further examine the entire payload of the packet to determine the application associated with the session. For example, application identification module 260 may use DPI to evaluate application behavior and classify the behavior as belonging to a certain type of application. In some examples, application identification module 260 may use DPI to identify an Real-time Transport Protocol (RTP) application or a TLS application. However, computing device 200 may create sessions using information obtained with DPI in limited circumstances. Therefore, application identification module 260 may use DPI to identify an application associated with a session with a low level of confidence.

In some examples, application identification module 260 may identify an application associated with a session using a service name specified by metadata of packets associated with the session. In some examples, a packet may carry metadata that specifies a service name which may provide application identification module 260 with sufficient context to identify the application associated with the packet. Routing component 260 may include a service name in a dataset maintained for each application type. This may provide application identification module 260 with a good way to identify traffic as belonging to particular private applications while maintaining a same structure as other types of applications.

As described herein, each session associated with packets received by computing device 200 possesses one or more of the identification properties described above, depending on the situation. In some examples, application identification module 260 may use multiple different methodologies to determine the application associated with each session, thereby increasing the accuracy in the determination. For example, a TLS session to a server using port 443 may include an SNI learned from a client certificate, may match a hostname based on DNS, may specify a hostname using metadata attached to a packet associated with the session, and may further be classified as HTTPS based on a port number associated with the session.

For the purposes of application identification, it is assumed that each session is associated with a single application. Additionally, application identification module 260 typically attempts each methodology in the order described above (e.g., built-in definitions, SNI, DNS, IP prefix, address information, DPI, and service name metadata), so as to increase the likelihood that application identification module 260 accurately identifies the application. In some examples, application identification module 260 performs basic normalization of each application. For example, application identification module 260 may normalize an SNI name to just the domain name (e.g., by excluding subdomains from the SNI). As another example, application identification module 260 may normalize names from multiple sources into a standard naming schema, such as defining all application names in "upper case" text strings and using hyphens instead of spaces within the application name.

Additionally, in some examples, application identification module 260 determines a traffic category or traffic class of the application. For example, application identification module 260 determines that the application belongs to a traffic category or traffic class such as a real-time traffic category, such as a Voice over Internet Protocol (VoIP) category, an Interactive Video category, a remote desktop category, or a gaming category or a non-real-time traffic category, such as a network management category, a streaming video category, an interactive data category, or a data transfer category. In some examples, the application may belong to another category not expressly described herein. For example, application identification module 260 may store, for each recognized application, an association with a particular traffic category or traffic class. For example, in response to determining that a first application is a first videoconferencing program provided by a first vendor, application identification module 260 may determine, based on a stored traffic category or class for the first videoconferencing program, that the application belongs to a Interactive Video category.

For each determined application of a plurality of applications, metrics module 262 generates metrics for the application at least in part from the metrics for each session determined to be associated with the application. For example, metrics module 262 aggregates a plurality of session-based metrics for each session associated with the application into metrics for the application. For example, metrics module 262 generates, for a first application, application-based metrics including a number of currently-established sessions of the plurality of sessions determined to be associated with the application; a number of sessions of the plurality of sessions determined to be associated with the application that failed to establish; a time during which the router processed a sequentially-first session of the plurality of sessions determined to be associated with the application; a time during which the router processed a most-recent sessions of the plurality of sessions determined to be associated with the application; a total number of bytes received by the router for the application; a total number of bytes sent by the router for the application; a total bandwidth used to receive data associated with the application; a total bandwidth used to send data associated with the application; a total amount of time during which the application is receiving or sending data; or a list of one or more client devices of the plurality of client devices associated with the application.

Some applications, such as SSH, SIP, etc. may be persistent and only periodically send data over a connection. Such applications typically send some small bursts of data for keeping the connection open (e.g., a "keepalive" packet). Such sessions, though useful, may not always reflect a true behavior of that application. In some examples, metrics module 262 computes an active session minutes metric and an active session count metric for the application, which may more accurately depict the behavior of the application. The active session minutes metric represents a total number of minutes consumed by an application. The active session count metric represents a total number of active sessions associated with the application. Metrics module 262 may computes a delta between a total bytes consumed over a 1-minute window:

$$\text{Bytes consumed} = T_N(\text{Bytes sent and received}) - T_{N-1}(\text{Bytes sent and received})$$

If the bytes consumed is greater than a predetermined threshold, metrics module 262 counts the session as being active for the associated application. This total number of active sessions is the active session count. For each active session, metrics module 262 computes the active session minutes metric, e.g., a total number of minutes the session has been active:

$$\text{If bytes consumed} \geq \text{Threshold: Active Session Minutes} = \text{Active Session Minutes} + 1$$

In some examples, the predetermined threshold is 0. In some examples, the predetermined threshold is application dependent such that the predetermined threshold is different for each different application. These metrics are new, specialized types of rate metrics which are meant to reflect how active a given application is at the moment and how many sessions are contributing to such activity. These metrics can be used to gauge an impact of a service degradation or outage for a given application.

Metrics module 262 may additionally generate other types of metrics not expressly described herein for each determined application. In some examples, router 110A generates the metrics for each application on a per-client, per-next-hop, or per-traffic class basis. In some examples, metrics module 262 generates such metrics on a periodic time interval (e.g., every 5 minutes). In some examples, the length of the time interval is configurable by a user. During this time interval, metrics module 262 may extract additional metadata from three types of sessions: sessions that are created within this window, sessions that are destroyed within this window, and long lived sessions that span this current window.

Additionally, metrics module 262 may generate session creation metrics for each session created during the time interval. In some examples, metrics module 262 tracks each client that accessed the application during the time interval. Because a source IP of a packet alone may not always uniquely identify a client associated with a session, the session creation metrics for each application include a total number of new sessions created per application, a total number of sessions failed to be created per application. Additionally, the session creation metrics for each application include, on a per-client and a per-application basis, a client source address, a tenant associated with the client, a name of the peer router 110 which generated the session (for, e.g., inter-router flows where application metrics are enabled on hub routers), services associated with the client sessions, next-hop interfaces to which the sessions are routed, next-hop peers to which sessions are routed, or a traffic class or priority level of the session.

For sessions that terminate during the time interval, metrics module 262 may generate session termination metrics. Such session termination metrics may provide additional datapoints on a per-application basis. In some examples, the session termination metrics include a total number of sessions associated with the application and destroyed during the time interval. In some examples, the session termination metrics include a minimum, maximum, and average length of sessions associated with the application and terminated during this window.

For long lived sessions that span across several time intervals, metrics module 262 may generate mid-flow session metrics on a per-application basis. For example, metrics module 262 may extract metrics across the following dimensions on a per-application basis: minimum, maximum, and average time to receive a first data byte of a session associated with the application; a total number of retransmission packets; and a number of active sessions per application. Because the reporting time interval is fixed, metrics module 262 may leverage the session creation timestamp to extract the minimum, maximum, and average time to receive the first data byte of a session (e.g., once per session) without the need to wait for the session to be terminated. This may be especially useful when dealing with long lived sessions. Additionally, for any given Software-as-a-Service (SaaS) application over any particular WAN circuit, some amount of packet retransmissions may occur. In some examples, this may be on the order of 1-2% of packets. Metrics module 262 may report this raw data to enable collector 160 of FIG. 1 to perform heuristic analysis for monitoring and troubleshooting of the application.

In some examples, router 110A transmits, to another device such as collector 160, the metrics for each application of the plurality of applications. Additionally, each router 110 of computer network system 2 may generate metrics for each application of the plurality of applications in a similar fashion and transmit such metrics to collector 160. Collector 160 collects the metrics for each application of the plurality of applications from each router 110 such that an administrator may use the metrics for network analysis and analytics. In some examples, collector 160 applies a machine learning system to the metrics for each application of the plurality of applications for application health or troubleshooting analysis.

In some examples, metrics module 262 generates, for each application of the plurality of applications, an application-specific JavaScript Object Notation (JSON) document comprising the one or more metrics for the application. In some examples, metrics module 262 generates a different JSON document comprising metrics for each of a plurality of different applications, for each of a plurality of different clients, for each of a plurality of different interfaces of computing device 200, for each of a plurality of different next-hops for each application, for each of a plurality of different traffic classes or priority levels for each application, or any combination thereof. In some examples, the JSON document further includes a list of tenants, services, or interfaces, etc., that each client of the application or service is currently using. This may enable an administrator to gain insight into the end-to-end usage of the application.

Routing component 250 transmits the JSON document to collector 160 for analysis. In some examples, routing component 250 transmits, for each application, a different JSON document comprising one or more metrics for the application to collector 160 for analysis. In some examples, routing component 250 collects the metrics for each application of the plurality of applications in a JSON document, before converting the JSON document into another format (e.g., such as a format derived from JSON) for transmission to collector 160.

An example JSON message format for exchanging application records is set forth below:

```
{
  "applicationSummary": "type",
  "applications": [
    {
      "name": " EXAMPLE-APPLICATION-NAME-1",
      "type": "< application | domain | address >",
      "category": "Search",
      "clients": [
        {
          "address": "192.168.10.10",
          "networkInterface": "lan",
          "tenant": "iot.home",
          "failedSessions": 0,
          "services": [
            "internet",
            "app-1"
          ],
          "nextHopInterface": [
            {
              "name": "broadband",
              "type": "PUBLIC",
              "trafficClass": "medium"
              "rxBytes": 102400,
```

-continued

```
                "txBytes": 1024000,
                "rxPackets": 10,
                "txPackets": 1024,
                "tcpResets": 1,
                "rxTcpRetransmissions": 10,
                "txTcpRetransmissions": 5,
                "closeBeforeEstablishment": 0,
                "newSessions": 10,
                "activeSessions": 100,
                "sessionLengthMs": {
                  "tcp": {
                    "max": 10000,
                    "min": 1000,
                    "total": 50000,
                    "count": 10
                  }
                },
                "timeToFirstDataPacketMs": {
                  "tcp": {
                    "max": 100,
                    "min": 20,
                    "total": 300,
                    "count": 10
                  }
                }
              }
            ]
          }
        ]
      }
    ]
  }
```

In some examples, application identification module 260 attempts to convert various session properties, such as IP addresses, ports, and domain names, to a well-defined application. However, not all traffic may always be categorizable. Rather than throw away such valuable raw information, which can be used for variety of purposes, in some examples, application identification module 260 may track such session properties independently. In some examples, the "type" field of the JSON application summary document may indicate a level of accuracy in the categorization of the application. In some examples, the "type" field specifies an "application" type, which indicates that application identification module 260 was able to successfully classify the traffic into a first class application. In some examples, the "type" field specifies a "domain" type, which indicates that the information represents a domain name learned via various learning techniques, such as SNI, HTTP, etc. In some examples, the "type" field specifies an "address" type, which indicates the destination address, port and protocol of the detected traffic. In some examples, the "type" field specifies an "unknown" type, which may be used for data not belonging to a particular application, such that collector 160 may use raw data for other types of analysis not expressly described herein.

In some examples, router 110A selects, based on the metrics for each application of the plurality of applications, a network path for use in forwarding at least one packet associated with a session that is associated with an application of the plurality of applications. In some examples, router 110A outputs, for presentation to a user, the metrics for each application of the plurality of applications.

Figure 3:
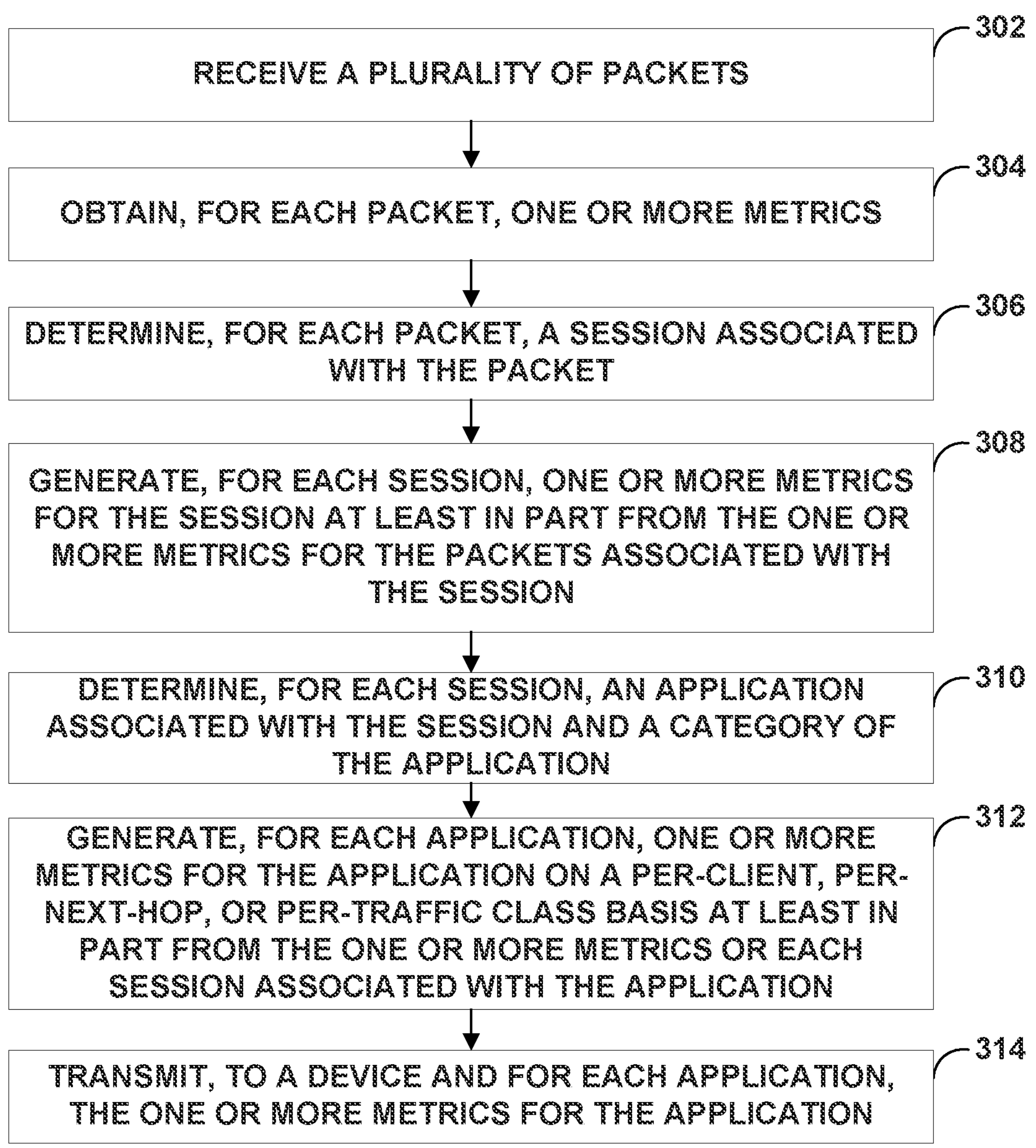
FIG. 3 is a flowchart illustrating an example operation in accordance with the techniques of the disclosure.

FIG. 3 is a flowchart illustrating an example operation in accordance with the techniques of the disclosure. FIG. 3 is described with respect to FIGS. 1 and 2 for convenience.

As depicted in the example of FIG. 3, router 110A receives a plurality of packets from, e.g., client devices 100 (302). For each packet received by router 110A, router 110A obtains one or more metrics for the packet (304). Additionally, for each packet received by router 110A, router 110A determines a session associated with the packet (306). For example, router 110 may use header information of a first packet (e.g., a source address, a source port, a destination address, a destination port, and a network protocol), to identify a first session associated with the first packet. The first session comprises a first forward packet flow originating from client device 100A and destined for client device 102A and a reverse packet flow originating from client device 102A and destined for client device 100A.

For each determined session, router 110A generates metrics for the session at least in part from the metrics for each packet determined to be associated with the session (308). For example, router 110A aggregates a plurality of packet-based metrics for each packet of the session into metrics for the session. Furthermore, for each determined session of the plurality of sessions, router 110A determines an application associated with the session (310). For example, router 110 may use any of multiple different techniques, such as built-in definitions, SNI, DNS, IP prefix, address information, DPI, service name metadata, etc., to determine the application associated with the session.

Additionally, in some examples, router 110 determines a traffic category or traffic class of the application. For example, router 110 determines that the application belongs to a traffic category or traffic class such as a real-time traffic category, such as a Voice over Internet Protocol (VoIP) category, an Interactive Video category, a remote desktop category, or a gaming category or a non-real-time traffic category, such as a network management category, a streaming video category, an interactive data category, or a data transfer category. In some examples, the application may belong to another category not expressly described herein.

For each determined application of a plurality of applications, router 110A generates metrics for the application, on a per-client, per-next-hop, and/or per-traffic class basis, at least in part from the metrics for each session determined to be associated with the application (312). For example, router 110A aggregates a plurality of session-based metrics for each session associated with the application into metrics for the application. In some examples, router 110A generates the metrics for each application on a per-client, per-next-hop, or per-traffic class basis. In some examples, router 110A generates, for each application of the plurality of applications, an application-specific JSON document comprising the one or more metrics for the application. In some examples, router 110A generates a different JSON document for each of a plurality of different clients, for each of a plurality of different interfaces of computing device 200, for each of a plurality of different traffic classes or priority levels of each application, or any combination thereof so as to provide metrics for the application on a per-client, per-next-hop, or per-traffic class basis.

In some examples, router 110A transmits, to another device such as collector 160, the metrics for each application of the plurality of applications (314). In some examples, router 110A transmits, for each application, a different JSON document comprising one or more metrics for the application to collector 160 for analysis. In some examples, router 110A collects the metrics for each application of the plurality of applications in a JSON document, before converting the JSON document into another format (e.g., such as a format derived from JSON) for transmission to collector 160. In some examples, router 110A selects, based on the metrics for each application of the plurality of applications, a network path for use in forwarding at least one packet associated with a session that is associated with an application of the plurality of applications. In some examples, router 110A outputs, for presentation to a user, the metrics for each application of the plurality of applications.

Figure 4:
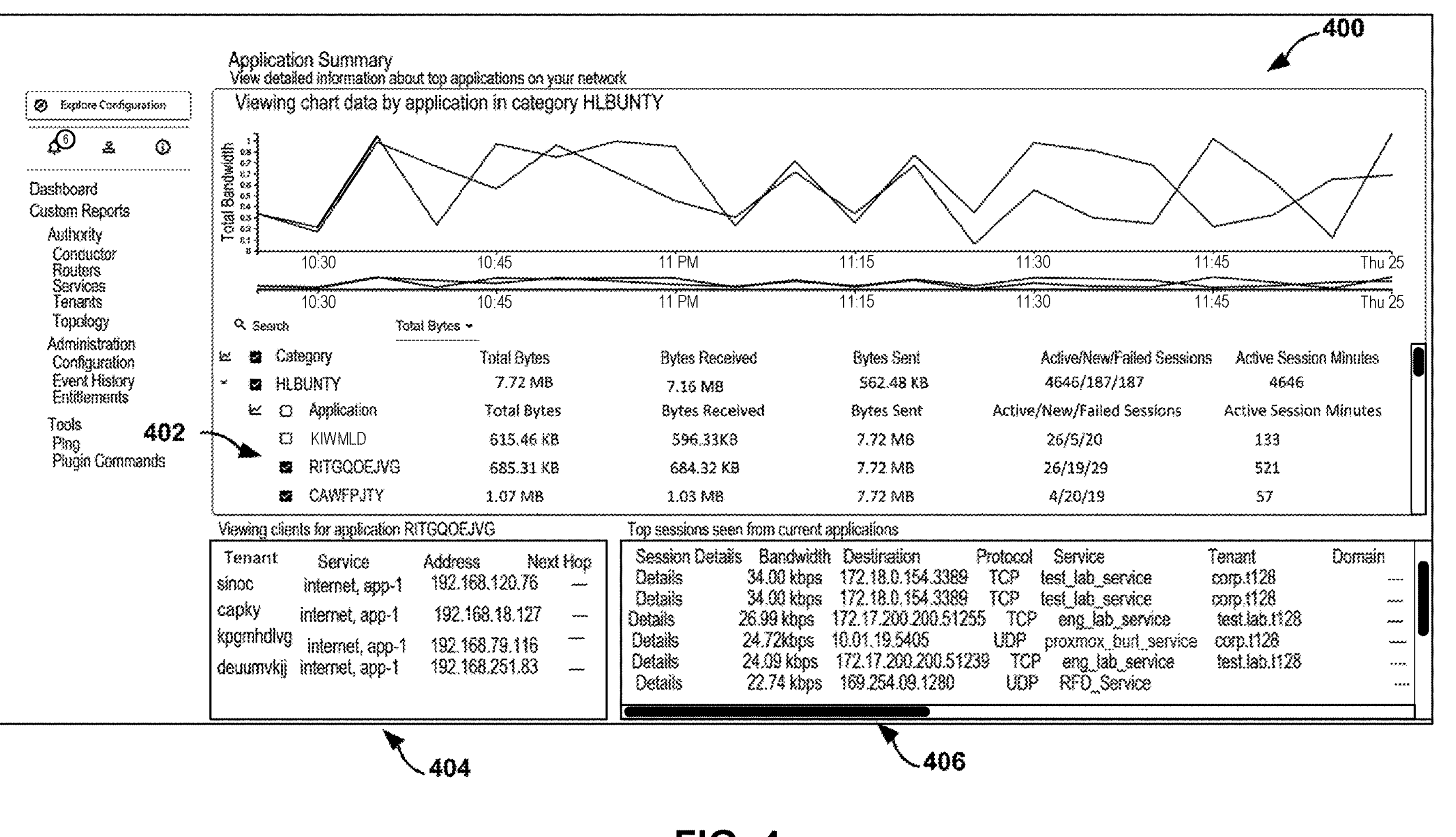
FIG. 4 is an illustration of an example user interface for a router in accordance with the techniques of the disclosure.

FIG. 4 is an illustration of example user interface 400 for a router in accordance with the techniques of the disclosure. In some examples, one of routers 110 of FIG. 1 or computing device 200 provides user interface 400 to enable a user or administrator to configure router 110.

As depicted in the example of FIG. 4, user interface 400 includes first sub-window 402 depicting an example application record generated using the techniques of the disclosure. The example application record includes, for client "HLBUNTY," a total bytes, a total bytes received, a total bytes sent, a number of active, new, and failed sessions, and a number of active session minutes. This data is further divided by each of three applications: "KIWMLD," "RITGQOEJVG," and "CAWFPJTY," so as to show a total bytes, a total bytes received, a total bytes sent, a number of active, new, and failed sessions, and a number of active session minutes for each application. User interface 400 further illustrates second sub-window 404 which presents, for application "RITGQOEJVG," each clients associated with the application: "slnoc," "cxipky," "kpgmhdvlg" and "deuumvkjj." User interface 400 further illustrates third sub-window 406, which presents the top sessions associated with the applications depicted in first sub-window 402, organized by bandwidth consumed by the session.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A network device comprising:

processing circuitry in communication with a memory, the processing circuitry configured to:

receive packets from client devices, wherein the received packets are associated with two or more sessions, and wherein each session of the two or more sessions is associated with a different application instance of a same application type;

determine the two or more sessions associated with the received packets, wherein each session of the two or more sessions comprises a corresponding forward packet flow and a corresponding reverse packet flow between respective ones of the client devices;

determine, based at least in part on the determined two or more sessions, the application type of each application instance associated with each corresponding session of the two or more sessions;

compute, for the determined application type, one or more application-based metrics comprising a total amount of time consumed by the application type across the different application instances corresponding to the two or more sessions, wherein the total amount of time consumed by the application type is based on an amount of time that each session of the two or more sessions is determined to be active, and wherein each session of the two or more sessions is determined to be active during a time interval of a plurality of time intervals based on a number of bytes exchanged for the session during the corresponding time interval exceeding a predetermined threshold; and forward the received packets for the two or more sessions along a path selected based at least in part on the one or more application-based metrics.

2. The network device of claim 1, wherein, to determine the two or more sessions associated with the received packets, the processing circuitry is configured to determine the two or more sessions associated with the received packets based on corresponding headers of the received packets, wherein each of the corresponding headers of the received packets comprises a source Internet Protocol (IP) address, a source port, a destination IP address, a destination port, and a network protocol.

3. The network device of claim 1, wherein the processing circuitry is configured to determine the application type based at least in part on:

an Internet Protocol (IP) address and a port of at least one of a source client device or a destination client device associated with each session of the two or more sessions; and a network protocol associated with each session of the two or more sessions.

4. The network device of claim 1, wherein the processing circuitry is configured to determine the application type based at least in part on a Server Name Indication (SNI) carried by the received packets associated with each session of the two or more sessions, the received packets sent in accordance with a Transport Layer Security (TLS) protocol.

5. The network device of claim 1, wherein the processing circuitry is configured to determine the application type based at least in part on at least one of:

a Domain Name Server (DNS) request associated with each session of the two or more sessions;

an Internet Protocol (IP) prefix of the received packets associated with each session of the two or more sessions;

a Deep Packet Inspection (DPI) of the received packets associated with each session of the two or more sessions; or a service name of each session of the two or more sessions.

6. The network device of claim 1, wherein, to compute the one or more application-based metrics, the processing circuitry is configured to:

generate an application-specific JavaScript Object Notation (JSON) document comprising the one or more application-based metrics; and transmit the application-specific JSON document to a computing device.

7. The network device of claim 1, wherein the processing circuitry is configured to compute the one or more application-based metrics the application type for each interface of a plurality of interfaces of the network device.

8. The network device of claim 1, wherein the processing circuitry is configured to compute the one or more application-based metrics the application type for each client of a plurality of clients associated with the plurality of client devices.

9. The network device of claim 1, wherein the one or more application-based metrics further comprise one or more of:

a number of currently-established sessions of the two or more sessions associated with the application instances of the same application type;

a number of sessions of the two or more sessions associated with the application instances of the same application type that failed to establish;

a time during which the network device processed a sequentially-first session of the two or more sessions associated with the application instances of the same application type;

a time during which the network device processed a most-recent session of the two or more sessions associated with the application instances of the same application type;

a total number of bytes received by the network device for the application instances of the same application type;

a total number of bytes sent by the network device for the application instances of the same application type;

a total bandwidth used to receive data associated with the application instances of the same application type;

a total bandwidth used to send data associated with the application instances of the same application type; or a list of one or more client devices associated with the application instances of the same application type.

10. The network device of claim 1, wherein the processing circuitry is further configured to select, based at least in part on the one or more application-based metrics, the path from a plurality of paths to one of the client devices, each path of the plurality of paths comprising two or more network devices.

11. A method comprising:

receiving, by a network device, packets from client devices, wherein the received packets are associated with two or more sessions, and wherein each session of the two or more sessions is associated with a different application instance of a same application type;

determining, by the network device, the two or more sessions associated with the received packets, wherein each session of the two or more sessions comprises a corresponding forward packet flow and a corresponding reverse packet flow between respective ones of the client devices;

determining, by the network device and based at least in part on the determined two or more sessions, the application type of each application instance associated with each session of the two or more sessions;

computing, by the network device, for the determined application type, one or more application-based metrics comprising a total amount of time consumed by the application type across the different application instances corresponding to the two or more sessions, wherein the total amount of time consumed by the application type is based on an amount of time that each session of the two or more sessions is determined to be active, and wherein each session of the two or more sessions is determined to be active during a time interval of a plurality of time intervals based on a number of bytes exchanged for the session during the corresponding time interval exceeding a predetermined threshold; and forwarding, by the network device, the received packets for the two or more sessions along a path selected based at least in part on the one or more application-based metrics.

12. The method of claim 11, wherein determining the two or more sessions associated with the received packets comprises determining the two or more sessions associated with the received packets based on corresponding headers of the received packets, wherein each of the corresponding headers of the received packets comprises a source Internet Protocol (IP) address, a source port, a destination IP address, a destination port, and a network protocol.

13. The method of claim 11, wherein determining the application type is based at least in part on:

an Internet Protocol (IP) address and a port of at least one of the source client device or a destination client device associated with a corresponding session of two or more sessions; and a network protocol associated with a corresponding session of the two or more sessions.

14. The method of claim 11, wherein determining the application type is based at least in part on a Server Name Indication (SNI) carried by the received packets associated with each session of the two or more sessions, the received packets sent in accordance with a Transport Layer Security (TLS) protocol.

15. The method of claim 11, wherein determining the application type is based at least in part on at least one of:

a Domain Name Server (DNS) request associated with each session of the two or more sessions;

an Internet Protocol (IP) prefix of the received packets associated with each session of the two or more sessions;

a Deep Packet Inspection (DPI) of the received packets associated with each session of the two or more sessions; or a service name of each session of the two or more sessions.

16. The method of claim 11, wherein computing the one or more application-based metrics comprises:

generating an application-specific JavaScript Object Notation (JSON) document comprising the one or more application-based metrics; and transmitting the application-specific JSON document to a computing device.

17. The method of claim 11, wherein computing the one or more application-based metrics comprises computing the one or more application-based metrics for each interface of a plurality of interfaces of the network device.

18. The method of claim 11, wherein computing the one or more application-based metrics comprises computing the one or more application-based metrics for each client of a plurality of clients associated with the plurality of client devices.

19. Non-transitory computer-readable media comprising instructions that, when executed, are configured to cause processing circuitry of a network device to:

receive packets from client devices, wherein the received packets are associated with two or more sessions, and wherein each session of the two or more sessions is associated with a different application instance of a same application type;

determine the two or more sessions associated with the received packets, wherein each session of the two or more sessions comprises a corresponding forward packet flow and a corresponding reverse packet flow between respective ones of the client devices;

determine, based at least in part on the determined two or more sessions, the application type of each application instance associated with each corresponding session of the two or more sessions;

compute, for the determined application type, one or more application-based metrics comprising a total amount of time consumed by the application type across the different application instances corresponding to the two or more sessions, wherein the total amount of time consumed by the application type is based on an amount of time that each session of the two or more sessions is determined to be active, and wherein each session of the two or more sessions is determined to be active during a time interval of a plurality of time intervals based on a number of bytes exchanged for the session during the corresponding time interval exceeding a predetermined threshold; and forward the received packets for the two or more sessions along a path selected based at least in part on the one or more application-based metrics.

* * * * *